(12) United States Patent
Lin

(10) Patent No.: US 12,348,659 B2
(45) Date of Patent: Jul. 1, 2025

(54) REAR PLATE AND PROTECTIVE CASE FOR ELECTRONIC DEVICE

(71) Applicant: Shenzhen Casebang Technology Co., Ltd., Shenzhen (CN)

(72) Inventor: Xiaojiong Lin, Shenzhen (CN)

(73) Assignee: Shenzhen Casebang Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/896,936

(22) Filed: Sep. 26, 2024

(65) Prior Publication Data

US 2025/0023973 A1 Jan. 16, 2025

Related U.S. Application Data

(63) Continuation of application No. PCT/CN2024/076172, filed on Feb. 5, 2024.

(30) Foreign Application Priority Data

| Jun. 16, 2023 | (CN) | 202321564829.5 |
| Sep. 28, 2023 | (CN) | 202322687225.6 |
| Sep. 28, 2023 | (CN) | 202322689102.6 |
| Dec. 2, 2023 | (CN) | 202323292886.5 |
| Dec. 2, 2023 | (CN) | 202323292904.X |
| Dec. 2, 2023 | (CN) | 202323305534.9 |

(51) Int. Cl.
*H04M 1/02* (2006.01)

(52) U.S. Cl.
CPC ................. *H04M 1/0283* (2013.01)

(58) Field of Classification Search
CPC .................................... H04M 1/0283
See application file for complete search history.

(56) References Cited

U.S. PATENT DOCUMENTS

| 9,894,192 | B2 | 2/2018 | Cox, III | |
| 2013/0170110 | A1* | 7/2013 | Lee | G06F 1/1626 361/679.01 |
| 2014/0128132 | A1* | 5/2014 | Cox, III | H04B 1/3888 455/575.8 |

FOREIGN PATENT DOCUMENTS

| CN | 207560118 U | 6/2018 |
| CN | 209330174 U | 8/2019 |
| CN | 212572659 U | 2/2021 |
| CN | 214315349 U | 9/2021 |
| CN | 216356844 U | 4/2022 |

* cited by examiner

Primary Examiner — Hsinchun Liao
(74) Attorney, Agent, or Firm — Andrew C. Cheng

(57) ABSTRACT

A rear plate and a protective case are provided. The rear plate is used to be installed on the protective case. An outer lens hole is provided on the rear plate, and a lens frame is provided at the outer lens hole. The lens frame includes a baffle located on one side of the rear plate and extending outwards. The baffle has at least one notch or at least two opposite notches, and/or one side of the rear plate has a rotational connection bracket. By providing the notch on the lens frame, when disassembling, the rear plate can be disassembled by holding the hand buckle formed by the notch, and the notch is not obvious and does not affect the aesthetic level of the appearance. In addition, when the rear plate is installed on the protective case, the rear plate can also be disassembled using the hand buckle.

16 Claims, 14 Drawing Sheets

REAR PLATE AND PROTECTIVE CASE FOR ELECTRONIC DEVICE

TECHNICAL FIELD

The present disclosure relates to the technical field of electronic equipment accessories, and in particular to a rear plate and a protective case for an electronic device.

BACKGROUND

Various types of protective cases for electronic devices are available based on the materials used, such as PC, leather, silicone, hard plastic, leather cases, and soft plastic. These cases not only enhance the aesthetic appeal of mobile phones but also provide protection against falls, scratches, water damage, and shocks. The market for protective cases is influenced by changing fashion trends, particularly among young consumers who are increasingly replacing their cases. This trend has led to a higher turnover rate of protective cases, resulting in resource wastage as basic cases are no longer sufficient to meet user requirements.

The current singular design of protective cases for electronic products limits the ability for users to switch to different styles without having to replace the entire case. This necessitates incurring a cost for each replacement, leading to unnecessary waste when the case is discarded.

Hence, a mobile phone case is presently available in the market featuring a removable rear plate. In instances where mobile phone cases are furnished with a protective frame for the lens, the detachable rear plate is strategically positioned to avoid interference with the lens protection frame. However, relying solely on magnetic attraction may result in insufficient bonding strength between the detachable rear plate and the mobile phone case, and the detachable rear plate and the mobile phone case will fit face to face, leading to a flush fit that complicates disassembly for users.

SUMMARY

In order to solve the problem that the existing removable rear plate is not easy to remove, the present disclosure provides a rear plate and a protective case for an electronic device.

To solve the technical problems above, the present disclosure provides a rear plate for installing on a protective case for an electronic device, where the rear plate is provided with an outer lens hole, a lens frame is provided at the outer lens hole, and a separation structure configured to separate the rear plate from the protective case is provided on the rear plate.

Preferably, the lens frame includes a baffle located on one side of the rear plate and extending outwards, and the separation structure is at least one notch or at least two oppositely disposed notches provided on the baffle.

Preferably, the separation structure is a bracket rotatably connected to one side of the rear plate.

Preferably, wherein the lens frame is detachably connected to the outer lens hole, and/or the lens frame is rotatably connected to the rear plate.

Preferably, wherein the notch is disposed on an outer peripheral side of the baffle.

Preferably, the lens frame further includes a clamping portion located on one side of the baffle close to the rear plate, and the clamping portion is provided with at least one protrusion; a slot is formed between the protrusion and the baffle; when the lens frame is connected to the rear plate, an inner wall of the outer lens hole is clamped into the slot.

Preferably, a width of the slot is matched with a thickness of the rear plate.

Preferably, the rear plate is further provided with a magnetic element arranged in a surrounding manner, and a region surrounded by the magnetic element is defined as a charging region.

To solve the technical problems above, the present disclosure further provides a protective case for an electronic device, including a main body and the rear plate mentioned above, where the main body includes a frame and a bottom plate, and the frame and the bottom plate are enclosed to form an accommodating slot for accommodating an electronic device; the rear plate is detachably connected to one side of the bottom plate away from the accommodating slot.

Preferably, a limiting structure is provided on one side of an inner wall of the outer lens hole, and a convex block or a groove is provided on the bottom plate at a position corresponding to the limiting structure; when the rear plate is connected to the bottom plate, the convex block is at least partially clamped into the limiting structure, or the limiting structure is accommodated in the groove.

Preferably, the bottom plate is provided with an inner lens hole corresponding to the outer lens hole, and a first clamping block is provided on one side of the convex block facing the inner lens hole; the lens frame is provided with a second clamping block that is matched with the first clamping block; when the rear plate is connected to the bottom plate, the convex block is at least partially clamped into the limiting structure, and the first clamping block is correspondingly clamped with the second clamping block.

Preferably, when the lens frame is connected to the rear plate, one side of the baffle abuts against the rear plate, and the baffle conceals the limiting structure.

Preferably, surfaces of the first clamping block and the second clamping block are arranged in an arc shape.

Preferably, the bottom plate is provided with a magnetic attraction member, and the rear plate is provided with a magnetic element that is magnetically attracted to the magnetic attraction member.

Preferably, the magnetic attraction member is arranged in a surrounding manner, a region, surrounded by the magnetic attraction member, on the bottom plate is defined as an inner region, and the inner region defines a charging region.

Preferably, a disassembly opening penetrating the bottom plate is provided in the inner region.

Preferably, one side of the bottom plate away from the accommodating slot is enclosed with the frame to form a limiting slot; when the rear plate is connected to the bottom plate, the rear plate is placed in the limiting slot.

In comparison to prior art, the connector and data cable of the present disclosure offers several advantageous features.

The rear plate is provided with an outer lens hole, and a lens frame is provided at the outer lens hole. The lens frame includes a baffle located on one side of the rear plate and extending outwards. The baffle is close to one side of the rear plate and is provided with at least one notch at the edge thereof. By directly clamping the lens frame onto the detachable rear plate, when disassembling the rear plate, the user can complete the disassembly of the rear plate by holding the hand buckle formed by the notch with his hand, and the notch is not obvious and does not affect the aesthetic level of the appearance. In addition, when the rear plate is installed on the protective case, the rear plate can also be disassembled using the hand buckle.

The side of the bottom plate away from the accommodating slot is enclosed with the frame to form a limiting slot. It can be understood that by providing the limiting slot to accommodate the rear plate, the protective case can be kept better in hand, and the rear plate will not protrude and affect the user experience. In addition, the limiting slot also restricts the translation of the rear plate.

The lens frame is clamped on the detachable rear plate. After the rear plate is connected to the bottom plate, the second clamping block on the lens frame also cooperates with the first clamping block on the bottom plate to further limit the rear plate, such that the rear plate and the bottom plate can be firmly connected at the lens frame and dust is not easy to enter.

BRIEF DESCRIPTION OF DRAWINGS

In order to more clearly illustrate the technical solutions of the embodiments of the present disclosure, the drawings needed to be used in the description of the embodiments will be briefly introduced below. Obviously, the drawings in the following description are some embodiments of the present disclosure. Those of ordinary skill in the art can also obtain other drawings based on these drawings without exerting creative work.

Figure 1:
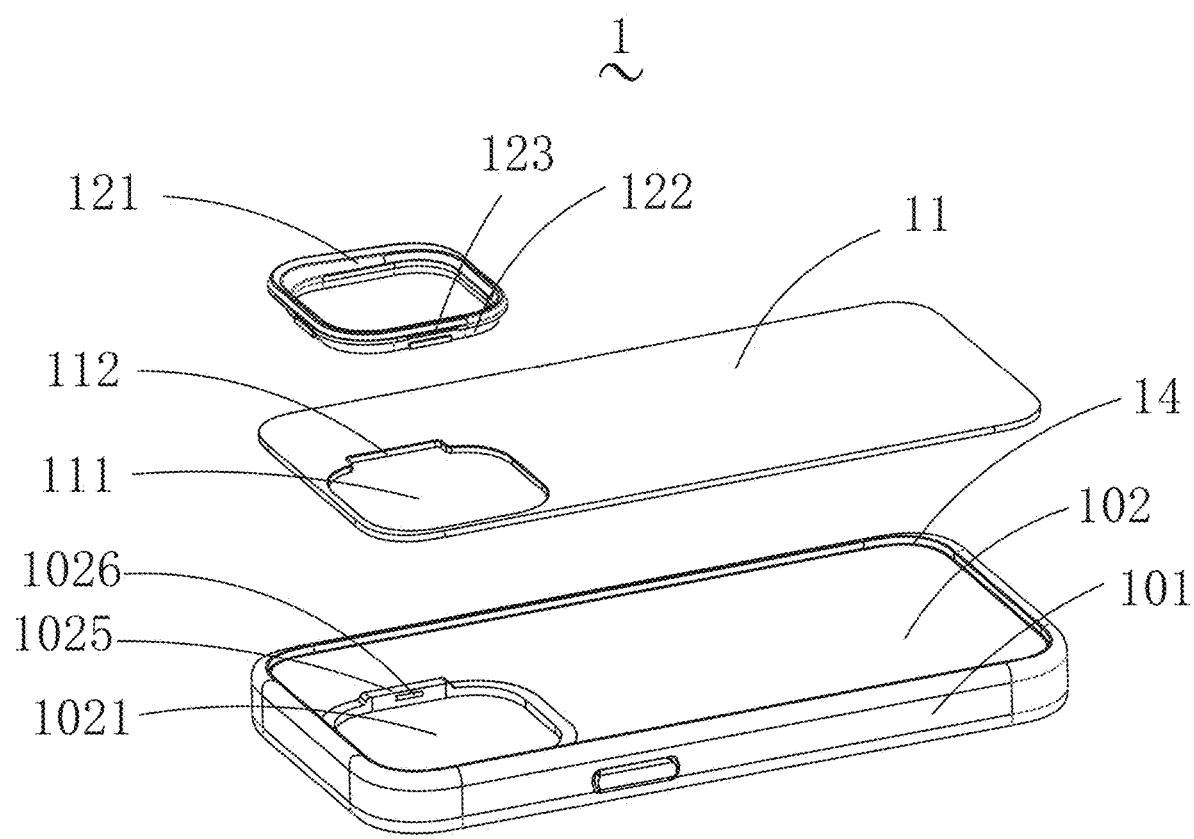
FIG. 1 is an exploded view of a protective case with a rear plate provided by a first embodiment of the present disclosure.

In the drawings, the parts represented by each number are listed as follows:
1. protective case;
10. main body; 11. rear plate; 12. lens frame; 13. accommodating slot; 14. limiting slot;
101. frame; 102. bottom plate; 111. outer lens hole; 112. limiting structure; 113. magnetic element; 114. bracket; 115. support member; 116. card package; 117. charging and discharging module; 121. baffle; 122. clamping portion; 123. notch; 124. protrusion; 125. slot; 126. second clamping block;
1021. inner lens hole; 1022. groove; 1023. magnetic attraction member; 1024. disassembly opening; 1025. convex block; 1026. first clamping block.

DETAILED DESCRIPTION

In order to make the purpose, technical solutions and advantages of the present disclosure more clear, the present disclosure will be further described in detail below with reference to the accompanying drawings and implementation examples. It should be understood that the specific embodiments described here are only used to explain the present disclosure and are not intended to limit the present disclosure.

It should be noted that when an element is referred to as being "fixed" to another element, it can be directly on the other element or intervening elements may also be present. When an element is referred to be "connected" to another element, it can be directly connected to the other element or there may also be intervening elements present. The terms "vertical," "horizontal," "left," "right" and similar expressions are used herein for illustrative purposes only.

In the present disclosure, the orientations or positional relationships indicated by terms "on", "below", "left", "right", "front", "back", "top", "bottom", "inner", "outer", "middle", "vertical", "horizontal", "longitudinal", etc. are based on the orientations or positional relationships shown in the drawings. These terms are mainly used to better describe the present disclosure and its embodiments and are not intended to limit the indicated device, element or component to having a specific orientation, or to be constructed and operated in a specific orientation.

Moreover, some of the above terms may also be used to express other meanings in addition to indicating orientation or positional relationships. For example, the term "on" may also be used to express a certain dependence relationship or connection relationship in some cases. For those of ordinary skill in the art, the specific meanings of these terms in the present disclosure can be understood according to specific circumstances.

In addition, the terms "mount," "dispose," "provide," "connect" are to be construed broadly. For example, it can be a fixed connection, a detachable connection, or an integral structure; it can be a mechanical connection or an electrical connection; it can be a direct connection, an indirect connection through an intermediary, or an internal connection between two devices, elements or components. For those of ordinary skill in the art, the specific meanings of the above terms in the present disclosure can be understood according to specific circumstances.

Figure 2:
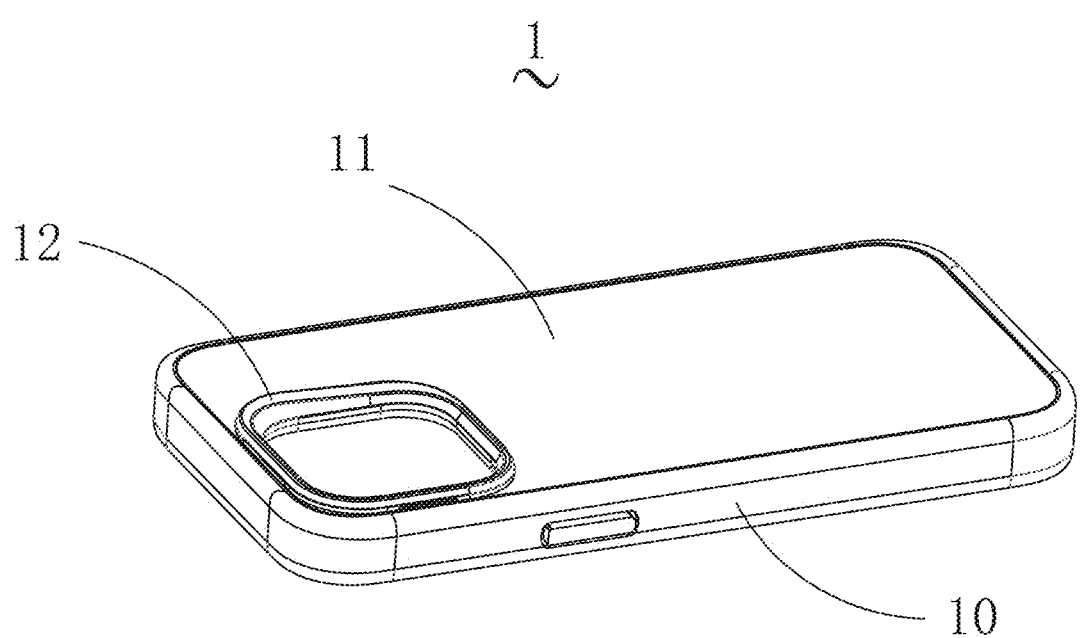
FIG. 2 is a perspective view of the protective case provided by the first embodiment of the present disclosure.
Figure 3:
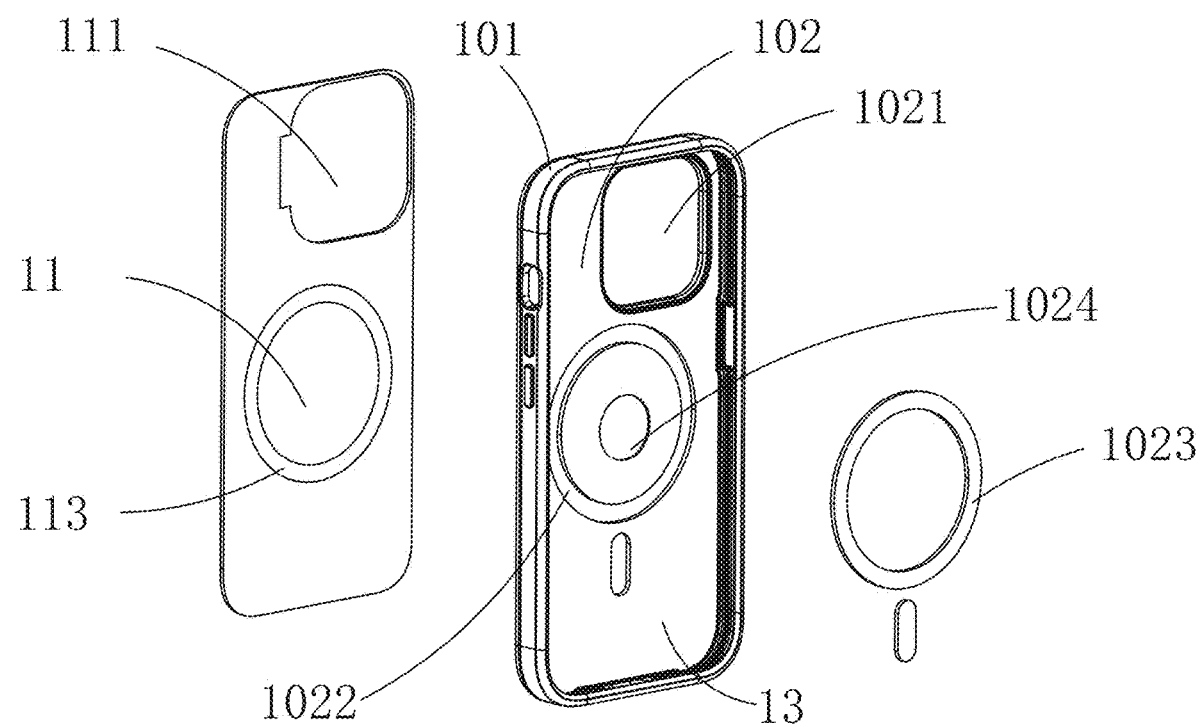
FIG. 3 is an exploded view of a partial structure of the protective case provided by the first embodiment of the present disclosure.

Please refer to FIGS. 1-3. A first embodiment of the present disclosure provides a protective case 1 for wrapping an electronic device in the protective case 1 for protection, which serves to safeguard the electronic device by preventing accidental drops, scratches to the screen or back, and providing waterproof and shockproof capabilities.

The electronic device, such as a mobile phone, serves as an illustrative example. Alternatively, the electronic device could also be a tablet computer or similar device in various embodiments. In this embodiment, the protective case 1 is designed in a square shape to fit the contours of the mobile phone. In other embodiments, if the mobile phone possesses different dimensions or shapes, the protective case 1 can be customized to correspondingly match the altered form.

The protective case 1 for an electronic device provided in this embodiment includes a main body 10 and a rear plate. The rear plate includes a lens frame. The main body 10 includes a frame 101 and a bottom plate 102. The frame 101 and the bottom plate 102 are enclosed to form an accommodating slot 13 for accommodating an electronic device. The rear plate 11 is detachably connected to the side of the bottom plate 102 away from the accommodating slot 13.

The frame 101 and the bottom plate 102 are non-detachable and integrally formed, and the side of the rear plate 11 facing away from the bottom plate 102 is provided with a pattern layer. The pattern layer is utilized to apply patterns and aesthetically pleasing designs in a specific style, primarily to customize the protective case's appearance and align with the user's preferences for the protective case's style.

The two opposing sides of the rear plate 11 and the bottom plate 102 are parallel to each other, such that the rear plate 11 can be completely attached to the bottom plate 102, which enhances the stability of the connection and minimizes the occurrence of gaps.

Further, the bottom plate 102 is provided with a magnetic attraction member 1023, and the rear plate 11 is provided with a magnetic element 113 that is magnetically attracted to the magnetic attraction member 1023.

The magnetic attraction member 1023 is arranged in a surrounding manner. In this embodiment, the magnetic attraction member 1023 is annular. Further, a groove 1022 is provided on the side of the bottom plate 102 facing the accommodating slot 13, and the magnetic attraction member 1023 is disposed in the groove 1022. It can be understood that when the magnetic attraction member 1023 is inserted into the groove 1022, the visible external surface of the magnetic attraction member 1023 does not extend beyond or may align with the side of the bottom plate 102 that faces the accommodating slot 13. This configuration ensures that the magnetic attraction member 1023 does not interfere with the positioning of the mobile phone or cause damage to the rear casing of the mobile phone.

It should be noted that the magnetic attraction member 1023 can be embedded in the groove 1022, or can be adhered to the groove 1022 using adhesive. Alternative methods of fixation may also be employed in various implementations, which are not exhaustively detailed in the present disclosure, as long as the magnetic attraction member 1023 is fixed in the groove 1022.

Further, the magnetic element 113 magnetically attracted to the magnetic attraction member 1023 may be disposed in the rear plate 11 or at any side of the rear plate 11.

Specifically, in this embodiment, the magnetic element 113 is disposed on a side of the rear plate 11 close to the bottom plate 102.

It can be understood that magnetic element 113, which may function as a magnet or a material exhibiting magnetic attraction, is positioned on the rear plate 11 to interact with the magnetic attraction member 1023 located on the bottom plate 102. The precise configuration and composition of the magnetic element 113 are not rigidly defined, as long as the attachment and connection of the rear plate 11 to the bottom plate 102 can be ensured.

As an optional implementation, the rear plate 11 may have a two-layer structure. A layer of the rear plate 11 close to the bottom plate 102 is the magnetic element 113, which is made of a magnet or a material that is magnetically attracted by the magnet. The other layer thereof is used to set background appearances such as patterns and shapes.

As a preferred implementation, the magnetic element 113 is a ring-shaped magnet, which is used to interact with the ring-shaped magnetic attraction member 1023. When employing wireless charging for mobile phones, the ring-shaped magnetic element can enhance the charging process and expedite charging efficiency. Additionally, the ring-shaped magnet can autonomously adjust the alignment between the protective case and the wireless charging coil, ensuring precise orientation of the electronic device towards the charging region, thereby facilitating swift and accurate positioning for wireless charging.

The region surrounded by the magnetic element 113 is a charging region, in which the electronic device can be charged.

Preferably, the magnetic element 113 is disposed in alignment with the magnetic attraction member 1023 to optimize material usage and maintain consistent magnetic attraction strength. By ensuring the alignment of these two elements, the rear plate 11 can automatically adjust to an appropriate position upon magnetic attraction, eliminating the necessity for manual user adjustments.

Further, in this embodiment, the groove 1022 is an annular groove, and at least one magnetic attraction member 1023 is disposed in the annular groove. When the number of the magnetic attraction member 1023 is one, the shape of the magnetic attraction member 1023 matches that of the groove 1022. That is, the magnetic attraction member 1023 is an annular magnetic attraction member.

It can be understood that annular arrangement of the magnet enables the magnetic attraction member 1023 located on the bottom plate 102 to be utilized in conjunction with various accessories, such as wireless chargers. This resolves the issue where the magnetic force weakens and the stability of suction is compromised when an electronic device enclosed in a protective case 1 is positioned on a wireless charger for charging. Furthermore, by disposing the magnetic attraction member 1023 on the bottom plate 102 and securely affixing the bottom plate 102 to the frame, the rear plate 11, attracted by the bottom plate 102, remains in place even when the wireless charger is detached, preventing its displacement due to magnetic forces.

In some other embodiments, a plurality of magnetic attraction members 1023 may be disposed in the groove 110. For example, the plurality of magnetic attraction members 1023 may be arranged at equal distances in the groove 1022. It can be understood that this configuration has the advantages as mentioned above, while also guaranteeing consistent magnetic force distribution.

Furthermore, in other embodiments, there may be a plurality of grooves 110, and the plurality of grooves 110 may be arranged in an annular array at intervals. There are accordingly a plurality of magnetic attraction members 1023, and one or more magnetic attraction members 1023 are provided correspondingly to each groove 1022. It can be understood that such an arrangement achieves almost the same effect as the above-mentioned arrangement, while saving more materials.

Specifically, in this embodiment, the magnetic attraction member 1023 and the magnetic element 113 are both annular in shape. In the context of mobile phone charging through wireless means, the utilization of the annular magnetic attraction member 1023 in conjunction with the magnetic element 113 serves to enhance the charging process and expedite its efficiency. Additionally, the annular magnet facilitates the automatic alignment of the protective case with the wireless charging coil, thereby simplifying the positioning of the mobile phone for swift wireless charging.

Further, the region, surrounded by the magnetic attraction member 1023, on the bottom plate 102, is defined as an inner region, and a disassembly opening 1024 penetrating the bottom plate 102 is provided in the inner region.

It can be understood that this configuration enhances both the aesthetic appeal and facilitates the removal of the rear plate 11 by exerting force in close proximity to the area of maximum magnetic force, which helps to prevent uneven stress on the rear plate 11 during disassembly, thereby reducing the likelihood of warping following repeated operations.

Further, the inner region defines a charging region.

The inner region is also the charging region. When the rear plate 11 is connected to the bottom plate 102, the two charging regions are aligned. Through the cooperation of the magnetic attraction member 1023 and the magnetic element 113 to align and adjust the position of the wireless charging coil, the electronic device can be charged according to the location of the charging region.

Further, the bottom plate 102 and the rear plate 11 are respectively provided with corresponding inner lens hole 1021 and outer lens hole 111, and the lens frame is located at the outer lens hole.

Further, in this embodiment, the lens frame 12 is detachably connected to the outer lens hole 111. It can be understood that users have the option to replace the rear plate 11 while retaining the lens frame 12, thus resulting in cost savings.

The bottom plate 102 and the rear plate 11 are respectively provided with the inner lens hole 1021 and the outer lens hole 111, which serve the purpose of exposing the camera of the mobile device. The lens frame 12 provided on the rear plate 11 serves to safeguard the camera. In the event of an accidental drop of the mobile device, the lens frame 12 functions as a protective barrier, mitigating the risk of camera damage from significant impact forces upon direct contact with the ground.

Figure 4:
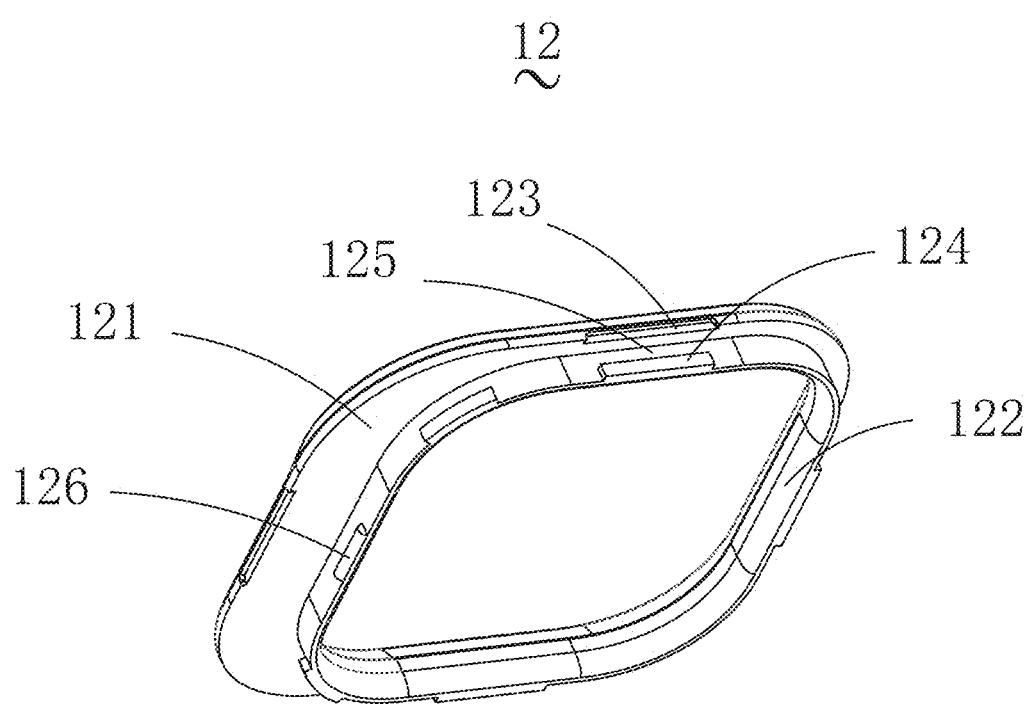
FIG. 4 is a schematic diagram of the lens frame of the protective case provided by the first embodiment of the present disclosure.

Please refer to FIG. 4. Further, in this embodiment, a separation structure is provided on the rear plate 11, and the separation structure is used to separate the rear plate from the protective case for the electronic device.

Specifically, in this embodiment, the lens frame 12 includes a baffle 121 located on one side of the rear plate 11 and extending outwards. The separation structure is at least one notch 123 or at least two oppositely disposed notches 123 opened on the baffle 121.

Specifically, the baffle 121 is located on the side of the rear plate 11 away from the bottom plate 102.

In this embodiment, the notch 123 is provided on the outer peripheral side of the baffle 121. The notch 123 can be disposed at the bottom, middle, and top of the outer peripheral side for hand buckle to facilitate pulling the rear plate away from the bottom plate, thereby allowing for portable replacement of the rear plate.

It can be understood that the extension of baffle 121 outwardly to envelop a portion of rear plate 11 close to the outer lens frame 12 serves to enhance the stability of the connection between baffle 121 and rear plate 11, thereby preventing the infiltration of dust into the gap between rear plate 11 and bottom plate 102. Additionally, the concealed nature of this arrangement guarantees that solely the rear plate 11 is visible from external viewpoints.

In addition, an opening is provided on the baffle 121, facilitating manual disassembly of the rear plate 11 and the lens frame 12 when the rear plate 11 is detached. This arrangement allows for direct access to the notch 123 for disassembling the rear plate 11 and the lens frame 12 simultaneously, thereby streamlining the separation process and minimizing operational complexity.

It can be understood that the inclusion of the disassembly opening 1024 is not essential given the structural configuration described. Both the disassembly opening 1024 and the notch 123 serve the purpose of facilitating disassembly and can be simultaneously incorporated. Consequently, when the notch 123 is utilized to lift the rear plate 11, the presence of a magnetic attraction force at the center of the rear plate 11 ensures that applying force through the disassembly opening 1024 can prevent the rear plate 11 from fracturing due to forces acting in two different directions.

Figure 5:
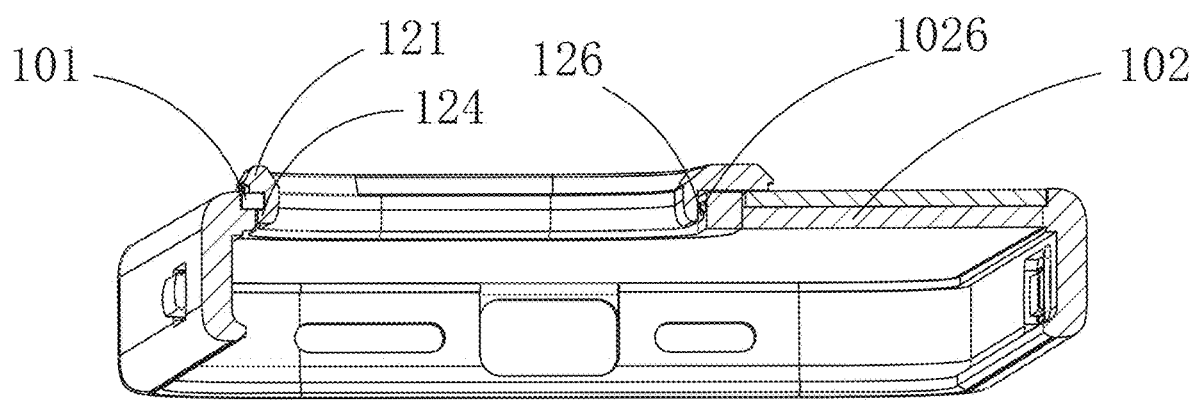
FIG. 5 is a schematic cross-sectional view of the protective case provided by the first embodiment of the present disclosure.

Further, please refer to FIGS. 4 and 5. The lens frame 12 also includes a clamping portion 122 located on the side of the baffle 121 close to the rear plate 11. The clamping portion 122 is provided with at least one protrusion 124. A slot 125 is formed between the protrusion 124 and the baffle 121. When the lens frame 12 is connected to the rear plate 11, the inner wall of the outer lens hole 111 is clamped into the slot 125.

It can be understood that the slot 125 formed between the protrusion 124 and the baffle 121 is used to clamp the edge of the rear plate 11 more effectively, thereby preventing the lens frame 12 from easily detaching. To remove the lens frame 12, users can simply extract it using the notch 123.

Figure 6:
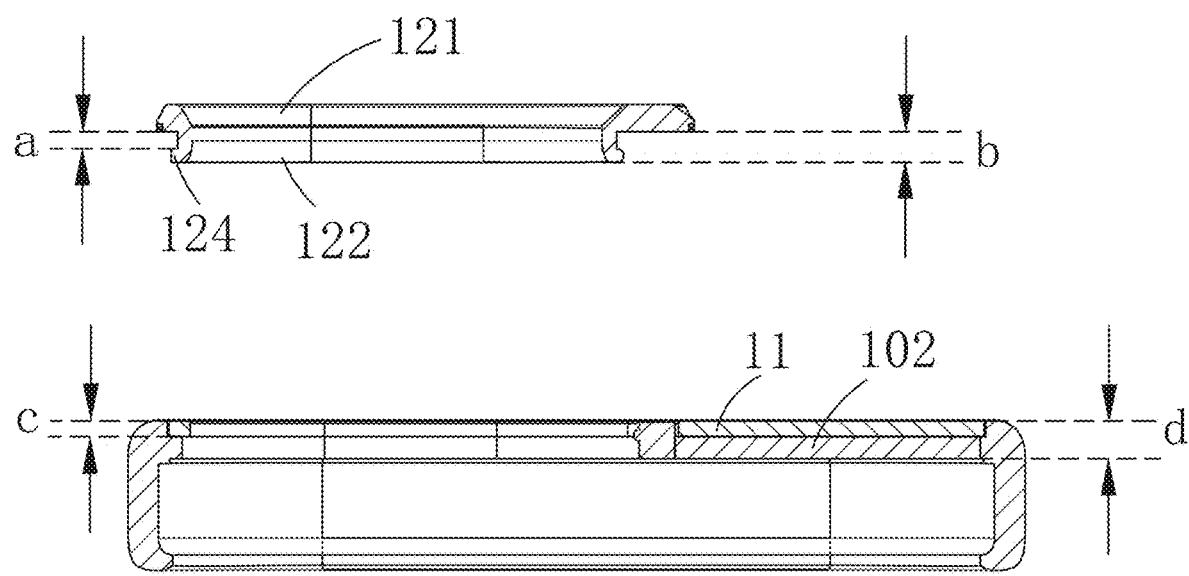
FIG. 6 is another schematic cross-sectional view of the protective case provided by the first embodiment of the present disclosure.

Further, please refer to FIG. 6. The width of the slot 125 matches the thickness of the rear plate 11.

As shown in FIG. 6, the width a of the slot 125 (a in FIG. 6) is equal to the thickness c of the rear plate 11 (c in FIG. 6), thereby enhancing the stability and tightness of the connection between the lens frame 12 and the rear plate 11, which serves to minimize the potential for shaking of the lens frame 12 and acts as a barrier against the entrance of dust particles.

Please continue to refer to FIG. 2. A limiting structure 112 is provided on one side of the inner wall of the outer lens hole 111, and a convex block 1025 or groove is provided, at the position corresponding to the limiting structure 112, on the bottom plate 102. When the rear plate 11 is connected to the bottom plate 102, the convex block 1025 is at least partially clamped into the limiting structure 112, or the groove accommodates the limiting structure.

In this embodiment, a convex block is provided on the bottom plate 102, and the limiting structure is a notch.

It can be understood that the accurate positioning of the rear plate 11 may be challenging due to the magnetic connection with the bottom plate 102, potentially impacting the overall aesthetics. Typically, even after the magnetic connection is established, manual adjustments by the user are often necessary. In this embodiment, the convex block 1025 and the limiting structure 112 serves to ensure the rear plate 11 be fully and correctly attracted to the bottom plate 102 when misaligned. The convex block 1025 restricts the positioning of the rear plate 11, eliminating the need for manual adjustments post-connection. Furthermore, the convex block 1025 effectively constrains the movement of the rear plate 11 during operation.

Further, please refer to FIGS. 2, 3, and 5. A first clamping block 1026 is provided on one side of the convex block 1025 facing the inner lens hole 1021, and the clamping portion 122 is provided with a second clamping block 126 that is matched with the first clamping block 1026. When the rear plate 11 is connected to the bottom plate 102, the convex block 1025 is at least partially clamped into the limiting structure 112, and the first clamping block 1026 is correspondingly clamped with the second clamping block 126.

It can be understood that the attachment of the lens frame 12 to the detachable rear plate 11, followed by the connection of the rear plate 11 to the bottom plate 102, results in the second clamping block 126 on the lens frame 12 working in conjunction with the first clamping block 1026 on the bottom plate 102 to constrain the position of the rear plate 11. This ensures a secure and snug connection between the rear plate 11 and the bottom plate 102 at the lens frame 12, thereby minimizing the likelihood of dust infiltration.

Further, when the lens frame 12 is connected to the rear plate 11, one side of the baffle 121 abuts against the rear plate 11, and the baffle 121 conceals the limiting structure 112.

It can be understood that the baffle 121 is used to conceal the limiting structure 112, which prevents dust from entering the limiting structure 112 while maintaining aesthetics thereof.

Further, the surfaces of the first clamping block 1026 and the second clamping block 126 are arranged in an arc shape.

It can be understood that the arc-shaped surface facilitates the seamless movement of the second clamping block 126 across the first clamping block 1026, enabling effective clamping or separation therebetween. This arrangement helps to mitigate the risk of damage or obstruction that may occur as a result of the interaction forces between the first clamping block 1026 and the second clamping block 126 during clamping or separation processes.

Please continue to refer to FIG. 6. Further, the thickness b of the clamping portion 122 (b in FIG. 6) is less than or equal to the total thickness d of the bottom plate 102 and the rear plate 11 (d in FIG. 6), which prevents part of the clamping portion 122 from protruding into the accommodating slot 13, ensures the bottom of the accommodating slot 13 flat, and prevents the lens or back case of the mobile phone from being scratched.

Please continue to refer to FIG. 2. Further, the side of the bottom plate 102 away from the accommodating slot 13 is enclosed with the frame 101 to form a limiting slot 14. When the rear plate 11 is connected to the bottom plate 102, the rear plate 11 is placed in the limiting slot 14.

It can be understood that by incorporating the limiting slot 14 to accommodate the rear plate 11, the tactile experience of the protective case 1 is enhanced and any protrusion of the rear plate 11 that could potentially disrupt the user's interaction can be prevented. Additionally, the limiting slot 14 serves to restrict the movement of the rear plate 11.

Figure 7:
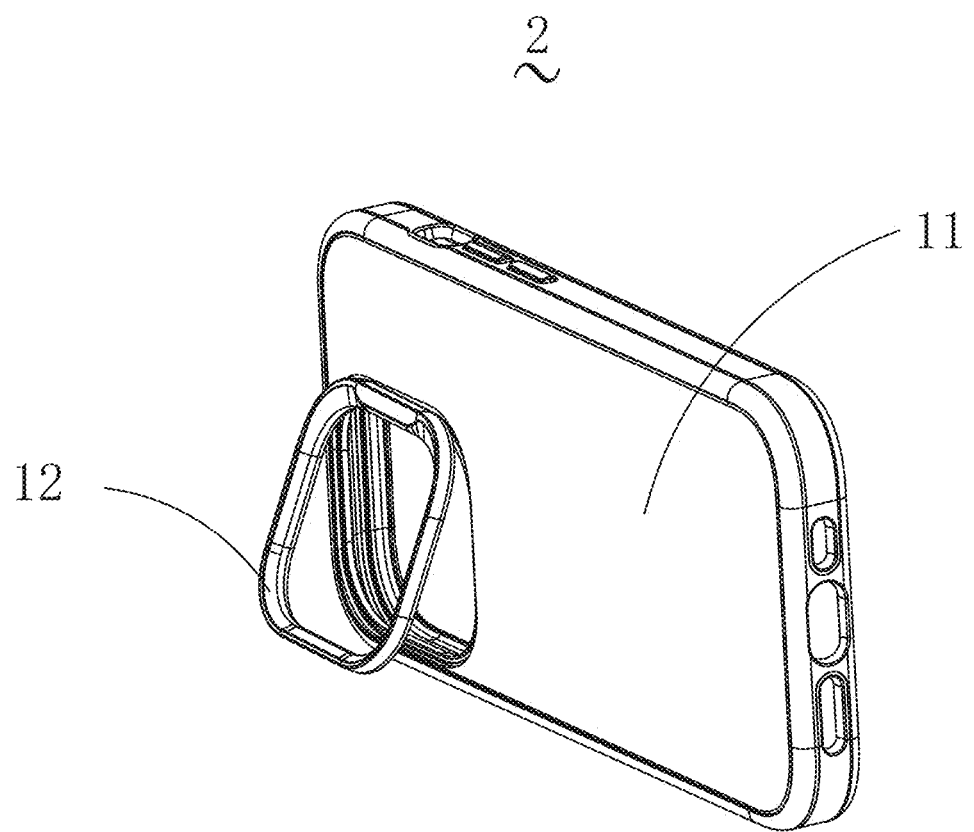
FIG. 7 is a schematic diagram of a protective case provided by a second embodiment of the present disclosure.

Please refer to FIG. 7. A second embodiment of the present disclosure provides a protective case 2 for an electronic device, which differs from the protective case 1 provided by the first embodiment in that the lens frame 12 is rotatably connected to the rear plate 11.

It can be understood that lens frame 12 serves a dual purpose: when opened, it functions as a bracket to prop up the electronic device and as a partition to separate the rear plate 11 from the protective case. Conversely, when closed, the lens frame 12 acts as a protective cover for the camera of the electronic device.

Figure 8:
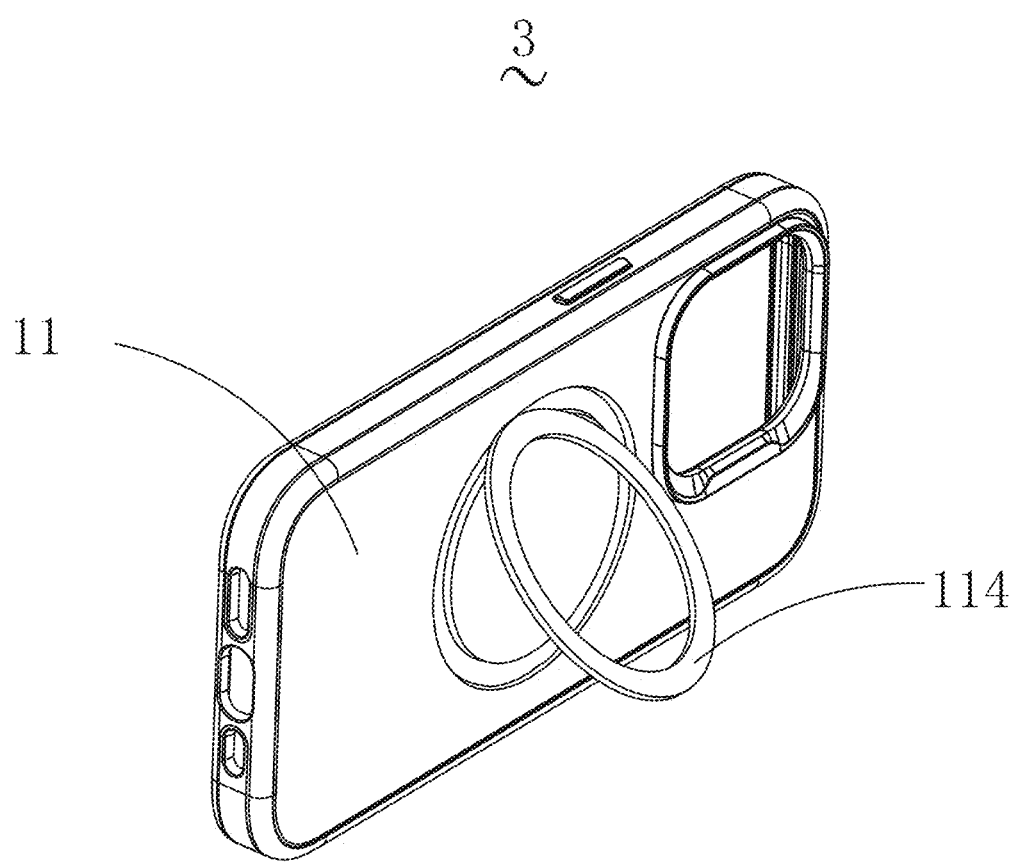
FIG. 8 is a schematic diagram of a protective case provided by a third embodiment of the present disclosure.

Please refer to FIG. 8. A third embodiment of the present disclosure provides a protective case 3 for an electronic device, which differs from the protective case 1 provided by the first embodiment in that the separation structure is a bracket 114 rotatably connected to one side of the rear plate 11.

The bracket 114 is provided on a side away from the bottom plate 102. It can be understood that the bracket 114 can be stored or opened, and when opened, the bracket 114 can support the electronic device. In addition, the bracket 114 can also be used to pull and remove the rear plate 11.

Figure 9:
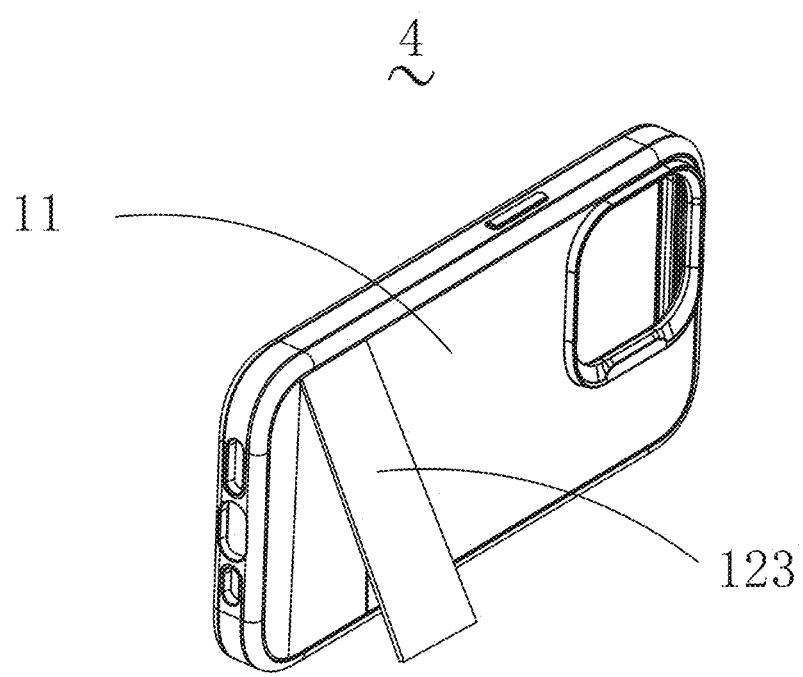
FIG. 9 is a schematic diagram of a protective case provided by a fourth embodiment of the present disclosure.

Please refer to FIG. 9. A fourth embodiment of the present disclosure provides a protective case 4 for an electronic device, which differs from the protective case 1 provided by the first embodiment in that the bracket 114 has a different shape and size, and the position of the bracket 114 on the rear plate 11 is also different.

It can be understood that a corresponding slot is disposed on the rear plate 11, such that the bracket 114 can be accommodated in the slot to prevent the bracket 114 from protruding and affecting the user experience.

The size, shape and appearance of the bracket 114 are not specifically limited.

Figure 10:
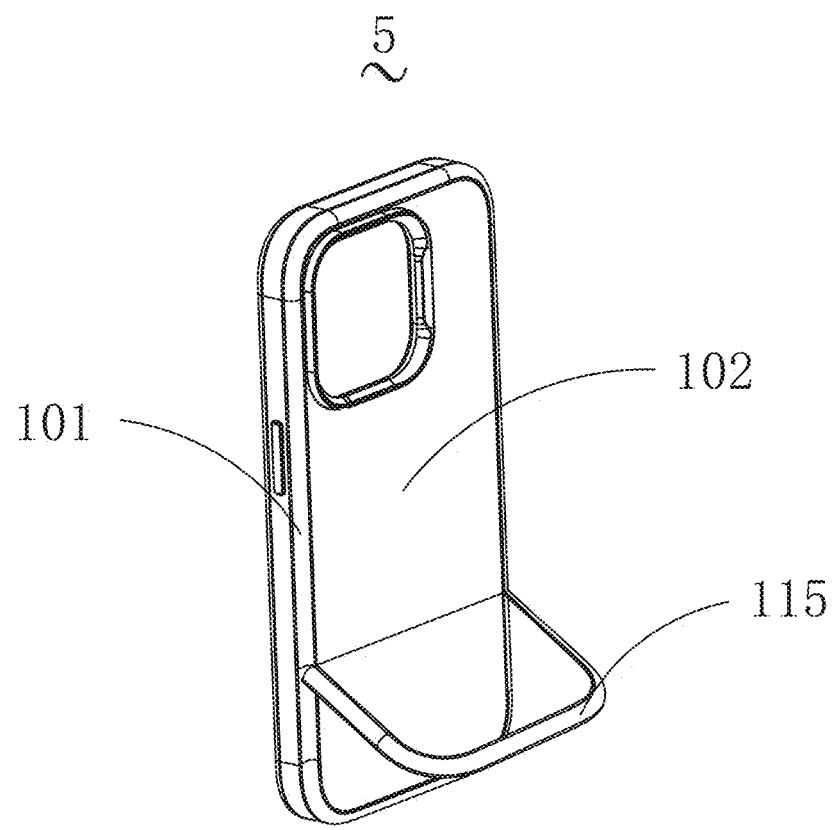
FIG. 10 is a schematic diagram of a protective case provided by a fifth embodiment of the present disclosure.

Please refer to FIG. 10. A fifth embodiment of the present disclosure provides a protective case 5 for an electronic device, which differs from the protective case 1 provided by the first embodiment in that a rotatably connected support member 115 is provided on the side of the frame 101 close to the bottom plate 102.

It can be understood that the function of the support member 115 in this embodiment is the same as that of the bracket 114 in the fourth embodiment, both are used to support the electronic device, which will not be repeated here.

Figure 11:
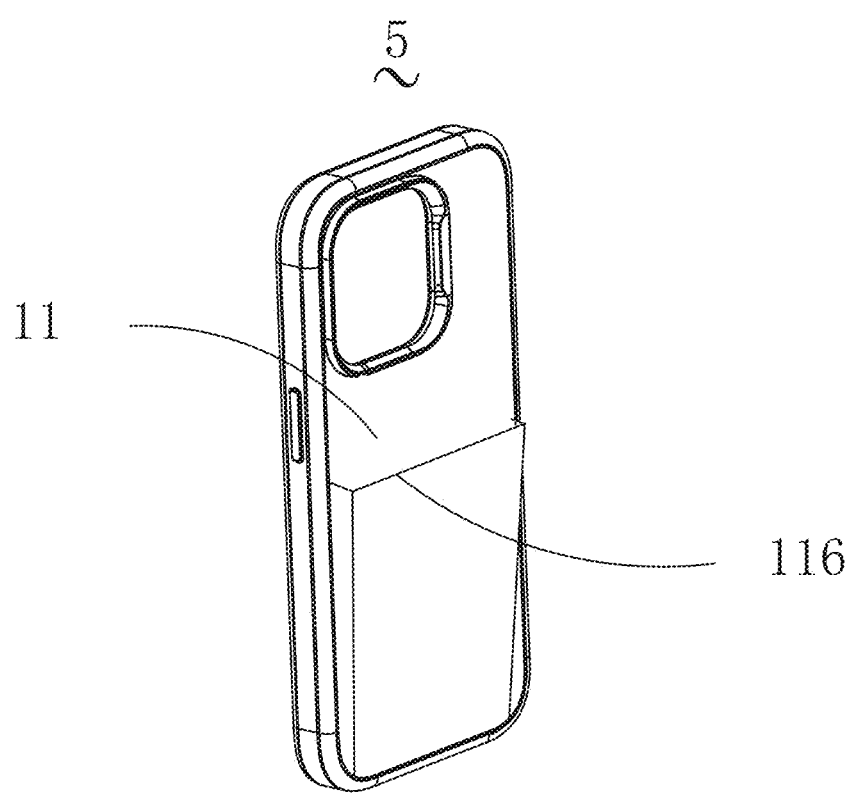
FIG. 11 is a schematic diagram of a protective case provided by a sixth embodiment of the present disclosure.

Please refer to FIG. 11. A sixth embodiment of the present disclosure provides a protective case 6 for an electronic device, which differs from the protective case 1 provided by the first embodiment in that a card package 116 is provided on the side of the rear plate 11 away from the bottom plate 102.

It can be understood that the card package 116 forms a space that can be used to place items such as documents.

Figure 12:
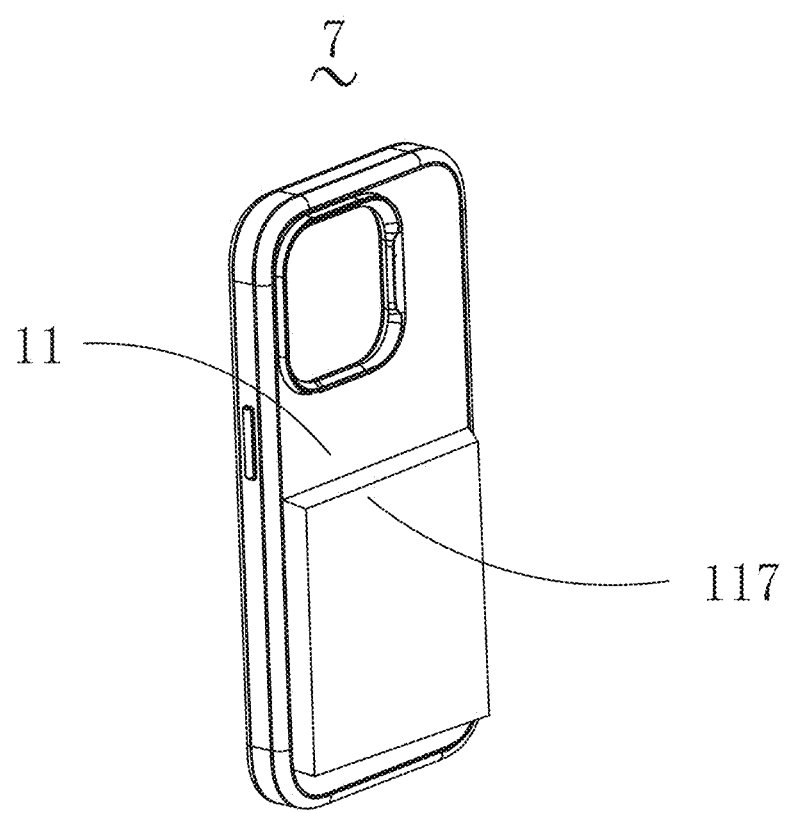
FIG. 12 is a schematic diagram of a protective case provided by a seventh embodiment of the present disclosure.

Please refer to FIG. 12. A seventh embodiment of the present disclosure provides a protective case 7 for an electronic device, which differs from the protective case 1 provided by the first embodiment in that a charging and discharging module 117 is provided on the rear plate 11.

It can be understood that the charging and discharging module 117 can be an energy storage battery, which can be used as an emergency power source to charge electronic devices and other functions, equivalent to a power bank.

Figure 13:
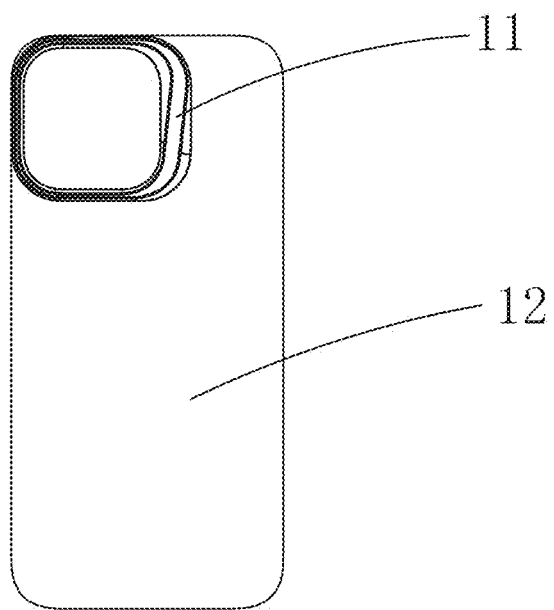
FIG. 13 is a schematic diagram of a rear plate and lens frame provided by an eighth embodiment of the present disclosure.
Figure 14:
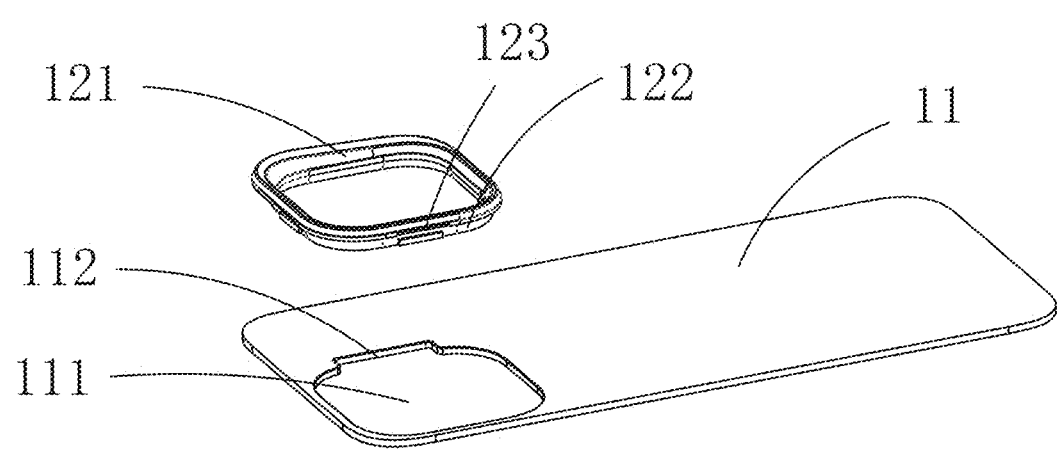
FIG. 14 is an exploded view of the rear plate and lens frame provided by the eighth embodiment of the present disclosure.

Please refer to FIGS. 1 and 13-14. An eighth embodiment of the present disclosure provides a rear plate 11 for installation on any protective case as described in the previous embodiments.

The rear plate 11 is provided with a magnetic element 113. The magnetic element 113 can be a magnet or a material magnetically attracted by a magnet. As an optional implementation, the rear plate 11 may have a two-layer structure. A layer of the rear plate 11 close to the bottom plate 102 is the magnetic element 113, which is made of a magnet or a material that is magnetically attracted by the magnet. The other layer thereof is used to set background appearances such as patterns and shapes.

As a preferred implementation, the magnetic element 113 is a ring-shaped magnet. When employing wireless charging for mobile phones, the ring-shaped magnetic element plays a crucial role in enhancing the charging process and expediting its efficiency. Additionally, the ring-shaped magnet is capable of autonomously adjusting the alignment between the protective case and the wireless charging coil, ensuring precise orientation of the electronic device towards the charging region, thereby facilitating swift and accurate positioning for wireless charging.

The region surrounded by the magnetic element 113 is a charging region, in which the electronic device can be charged.

Further, the rear plate 11 is provided with an outer lens hole 111, and the lens frame 12 is located at the outer lens hole 11. The lens frame 12 includes a baffle 121 located on one side of the rear plate 11 and extending outwards. The separation structure is at least one notch 123 or at least two oppositely disposed notches 123 opened on the baffle 121.

Specifically, the baffle 121 is located on the side of the rear plate 11 away from the bottom plate 102.

In this embodiment, the notch 123 is provided on the outer peripheral side of the baffle 121. The notch 123 can be disposed at the bottom, middle, and top of the outer peripheral side for hand buckle to facilitate pulling the rear plate away from the bottom plate, thereby allowing for portable replacement of the rear plate.

In addition, an opening is provided on the baffle 121, such that when the rear plate 11 is taken apart, the notch 123 can be manually grasped to facilitate the disassembly of both the rear plate 11 and the lens frame 12 simultaneously, which allows for the subsequent separation of the rear plate 11 and the lens frame 12 through the use of the notch 123, thereby streamlining the operational process.

Further, the lens frame 12 is detachably connected to the outer lens hole 111. It can be understood that when substituting the preferred rear plate 11, the user has the option to replace only the rear plate 11 while keeping the lens frame 12, thus resulting in cost savings.

In other embodiments, the lens frame 12 is rotatably connected to the rear plate 11. It can be understood that when the lens frame 12 is in the open position, it serves as a bracket for providing support to the electronic device and can also function as a partition structure to separate the rear plate 11 from the protective case. Conversely, when the lens frame 12 is closed, it is utilized to safeguard the camera of the electronic device.

The lens frame 12 also includes a clamping portion 122 located on the side of the baffle 121 close to the rear plate 11. The clamping portion 122 is provided with at least one protrusion 124. A slot 125 is formed between the protrusion 124 and the baffle 121. When the lens frame 12 is connected to the rear plate 11, the inner wall of the outer lens hole 111 is clamped into the slot 125.

It can be understood that the slot 125 formed between the protrusion 124 and the baffle 121 is to secure the edge of the rear plate 11 more effectively, thereby preventing the lens frame 12 from easily detaching. To remove the lens frame 12, users can simply extract it using the notch 123.

In other embodiments, the separation structure is a bracket 114 rotatably connected to one side of the rear plate 11.

The bracket 114 is provided on a side away from the bottom plate 102. It can be understood that the bracket 114 can be stored or opened, and when opened, the bracket 114 can support the electronic device. In addition, the bracket 114 can also be used to pull and remove the rear plate 11.

Further, the width of the slot 125 matches the thickness of the rear plate 11, which makes the connection between the lens frame 12 and the rear plate 11 more secure and tight to prevent the lens frame 12 from shaking and prevent dust from entering.

Compared with the prior art, the rear plate and the protective case for an electronic device provided by the present disclosure have the following advantages:

The rear plate is provided with an outer lens hole, and a lens frame is provided at the outer lens hole. The lens frame includes a baffle located on one side of the rear plate and extending outwards. The baffle is close to one side of the rear plate and is provided with at least one notch at the edge thereof. By directly clamping the lens frame onto the detachable rear plate, when disassembling the rear plate, the user can complete the disassembly of the rear plate by holding the hand buckle formed by the notch with his hand, and the notch is not obvious and does not affect the aesthetic level of the appearance. In addition, when the rear plate is installed on the protective case, the rear plate can also be disassembled using the hand buckle.

The side of the bottom plate away from the accommodating slot is enclosed with the frame to form a limiting slot. It can be understood that by providing the limiting slot to accommodate the rear plate, the protective case can be kept better in hand, and the rear plate will not protrude and affect the user experience. In addition, the limiting slot also restricts the translation of the rear plate.

The lens frame is clamped on the detachable rear plate. After the rear plate is connected to the bottom plate, the second clamping block on the lens frame also cooperates with the first clamping block on the bottom plate to further limit the rear plate, such that the rear plate and the bottom plate can be firmly connected at the lens frame and dust is not easy to enter.

The invention claimed is:

1. A rear plate for installing on a protective case for an electronic device, wherein the rear plate is provided with an outer lens hole, a lens frame is provided at the outer lens hole, and a separation structure configured to separate the rear plate from the protective case is provided on the rear plate; wherein the rear plate is further provided with a magnetic element arranged in a surrounding manner, and a region surrounded by the magnetic element is defined as a charging region.

2. A protective case for an electronic device, comprising a main body and a rear plate according to claim 1, wherein the main body comprises a frame and a bottom plate, and the frame and the bottom plate are enclosed to form an accommodating slot for accommodating an electronic device; the rear plate is detachably connected to one side of the bottom plate away from the accommodating slot.

3. The protective case of claim 2, wherein a limiting structure is provided on one side of an inner wall of the outer lens hole, and a convex block or a groove is provided on the bottom plate at a position corresponding to the limiting structure; when the rear plate is connected to the bottom plate, the convex block is at least partially clamped into the limiting structure, or the limiting structure is accommodated in the groove.

4. The protective case of claim 3, wherein the bottom plate is provided with an inner lens hole corresponding to the outer lens hole, and a first clamping block is provided on one side of the convex block facing the inner lens hole; the lens frame is provided with a second clamping block that is matched with the first clamping block; when the rear plate is connected to the bottom plate, the convex block is at least partially clamped into the limiting structure, and the first clamping block is correspondingly clamped with the second clamping block.

5. The protective case of claim 4, wherein when the lens frame is connected to the rear plate, one side of the baffle abuts against the rear plate, and the baffle conceals the limiting structure.

6. The protective case of claim 4, wherein surfaces of the first clamping block and the second clamping block are arranged in an arc shape.

7. The protective case of claim 2, wherein the bottom plate is provided with a magnetic attraction member, and the rear plate is provided with a magnetic element that is magnetically attracted to the magnetic attraction member.

8. The protective case of claim 7, wherein the magnetic attraction member is arranged in a surrounding manner, a region, surrounded by the magnetic attraction member, on the bottom plate is defined as an inner region, and the inner region defines a charging region.

9. The protective case of claim 8, wherein a disassembly opening penetrating the bottom plate is provided in the inner region.

10. The protective case of claim 2, wherein one side of the bottom plate away from the accommodating slot is enclosed with the frame to form a limiting slot; when the rear plate is connected to the bottom plate, the rear plate is placed in the limiting slot.

11. A rear plate for installing on a protective case for an electronic device, wherein the rear plate is provided with an outer lens hole, a lens frame is provided at the outer lens hole, and a separation structure configured to separate the rear plate from the protective case is provided on the rear plate; wherein the lens frame comprises a baffle located on one side of the rear plate and extending outwards, and the separation structure is at least one notch or at least two oppositely disposed notches provided on the baffle.

12. The rear plate of claim 11, wherein the separation structure is a bracket rotatably connected to one side of the rear plate.

13. The rear plate of claim 11, wherein the lens frame is detachably connected to the outer lens hole, and/or the lens frame is rotatably connected to the rear plate.

14. The rear plate of claim 11, wherein the notch is disposed on an outer peripheral side of the baffle.

15. The rear plate of claim 11, wherein the lens frame further comprises a clamping portion located on one side of the baffle close to the rear plate, and the clamping portion is provided with at least one protrusion; a slot is formed between the protrusion and the baffle; when the lens frame is connected to the rear plate, an inner wall of the outer lens hole is clamped into the slot.

16. The rear plate of claim 15, wherein a width of the slot is matched with a thickness of the rear plate.

* * * * *